United States Patent [19]
Scanlon

[11] Patent Number: 5,558,932
[45] Date of Patent: Sep. 24, 1996

[54] INTEGRATED STRUCTURAL COMPOSITE AND CERAMIC FLAME BARRIER

[75] Inventor: John F. Scanlon, Bath, Mich.

[73] Assignee: Auto-Air Composites, Inc., Lansing, Mich.

[21] Appl. No.: 310,472

[22] Filed: Sep. 22, 1994

[51] Int. Cl.$^6$ ............... D03D 3/00; B32B 5/02; B32B 7/00; B27N 9/00

[52] U.S. Cl. ............... 428/229; 428/236; 428/246; 428/251; 428/252; 428/286; 428/920

[58] Field of Search ............... 428/229, 251, 428/252, 286, 302, 902, 920, 921

[56] References Cited

U.S. PATENT DOCUMENTS

| | | |
|---|---|---|
| 4,567,085 | 1/1986 | Gey et al. ............... 428/163 |
| 4,876,153 | 10/1989 | Thorfinnson ............... 428/447 |
| 4,892,774 | 1/1990 | Vallance ............... 428/174 |
| 5,198,152 | 3/1993 | Liimatta et al. ............... 252/389.31 |

*Primary Examiner*—James D. Withers
*Attorney, Agent, or Firm*—Knechtel, Demeur & Samlan

[57] ABSTRACT

An integrated structural composite panel and ceramic flame barrier which is a structural load bearing support member while exhibiting superior flame resistant characteristics. There is a first layer which is a structural polymer composite which defines the form of the finished supporting member. A second layer is a fiber reinforced film adhesive which binds the third layer to the first layer. The third layer is a polymer precursor of a ceramic matrix which exhibits polymeric properties at a lower temperature and ceramic matrix properties at a higher temperature. The three layers are co-cured in a one step process.

8 Claims, 1 Drawing Sheet

INTEGRATED STRUCTURAL COMPOSITE AND CERAMIC FLAME BARRIER

This invention broadly relates to new and improved fireproofing mechanisms. More particularly, it relates to a new and improved integrated structural composite and flame barrier. More particularly still, it relates to a one step process for fabricating such an integrated structural composite and flame barrier. Examples of products which could utilize the present invention are, firewalls for vehicles and aircraft, theater seats, counters and cabinets for aircrafts and boats, and various residential application. Indeed, any load bearing or structured member or products which are desired to have increased fire or flame barrier qualities could utilize the present invention. For the sake of brevity, the integrated structural composite and flame barrier hereinafter is referred to as simply a structural firewall.

Current fire-proofing mechanisms normally are added as after the fact components to structural members. As an example, in an aircraft a flame barrier typically is added to the structural bulkhead of the aircraft as a post-process technique after the structural bulkhead has been formed. This two step process allows a very wide diversity in the type of flame barriers which are added. However, this two step process is costly in comparison to the cost of an integrated process where the flame barrier and structural member could be consolidated in a one step process. Presently used materials for firewall barriers also are traditionally heavy or nonstructural, or both.

An example of a fabric used for a flame barrier is illustrated in U.S. Pat. 4,994,317. However, this fabric cannot be used to support any weight and has no load bearing structural strength.

An example of a flame resistant composite sheet is shown in U.S. Pat. 4,686,135. However, this panel has the flame resistant material embedded within one of the sheet layers. Also, the flame resistant material does not change its characteristics when subjected to a flame to further increase its flame resistance characteristics such as applicant's invention.

An optimal structural firewall would be a load carrying member of the firewall structure, and would be capable of being processed in one curing step. It also would be lightweight and capable of withstanding a high temperature flame for an extended period of time without burnthrough. No known one step process now exists to accomplish all these goals. The structural firewall of the invention accomplishes all of these goals and, in addition, provides many unanticipated advantages, as described below.

Accordingly, it is an object of the invention to provide a new and improved structural firewall.

It is another object to provide a structural member having greatly improved flame resistant characteristics than prior similar structural members. Related to this object is the object of providing a structural member which can be molded into the desired shape for the purpose intended using standard molding techniques and equipment.

It is another object to provide an integrated process where the flame barrier and structural member forming the structural firewall is consolidated in a one-step process.

Still another object is to provide a structural firewall which is lightweight and capable of withstanding a high temperature flame for an extended period of time without burnthrough.

The above objectives are accomplished in accordance with the invention by co-curing a polymer based composite structure and a face sheet or sheets of glass, carbon or ceramic fiber in a polymer precursor of a ceramic matrix, in a one step process. A separation mechanism is used to prevent diffusion of the precursor matrix and the polymeric matrix during the co-curing process and also serves the purpose of bonding the two structures during the co-curing process. The separation mechanism may be, for example, a glass fiber scrim reinforced film adhesive.

During the co-curing process, the structural firewall is produced, however, the polymer precursor remains a polymer until such time that it is subjected to a high temperature far in excess of the co-curing temperature. It is only at that time that it undergoes a conversion to a silica ceramic, forming an insitu flame barrier with superior flame resistance. Accordingly, a number of unanticipated advantages are provided.

For example, the one step method lends itself to traditional composite fabrication techniques, such as, autoclave curing. It also is found that the integrated structural composite and flame barrier panel forming the structural firewall retains high strain-to-failure properties prior to being subjected to a high flame temperature. As a result, the panel is a true load sharing member of the structure prior to being exposed to a high flame temperature, and the strength of the entire structure therefore contributes to enhanced long term fatigue properties.

In fabricating the structural firewall, a number of different reinforcing fibers can be used in the ceramic polymer precursor since processing temperatures are low, in the range of 150°–350° F. Accordingly, the fibers can be selected to enhance flame protection or to provide other attributes such as volume change upon application of high temperatures.

The ceramic polymer precursor encapsulates and protects the reinforcing fibers from oxidation at high temperatures (1800°–2200° F.). This allows a number of reinforcing fibers and their different attributes which would normally not be suitable for use, such as, carbon, graphite or glass fibers. Use of high modulus graphite fibers, as an example, would provide high thermal conductivity to help conduct heat away from an area of the firewall which is subjected to high temperatures.

As a result of these advantages, the invention has a wide range of applicability, including, but not limited to, structural housings, firewalls, fire barriers, flame resistant ducting, residential and military vehicles and structures.

DESCRIPTION OF THE DRAWING

The drawing of FIG. 1 is a cross-sectional view generally illustrating a typical load bearing member or structural firewall, in accordance with the invention.

DESCRIPTION OF A PREFERRED EMBODIMENT

Figure 1:
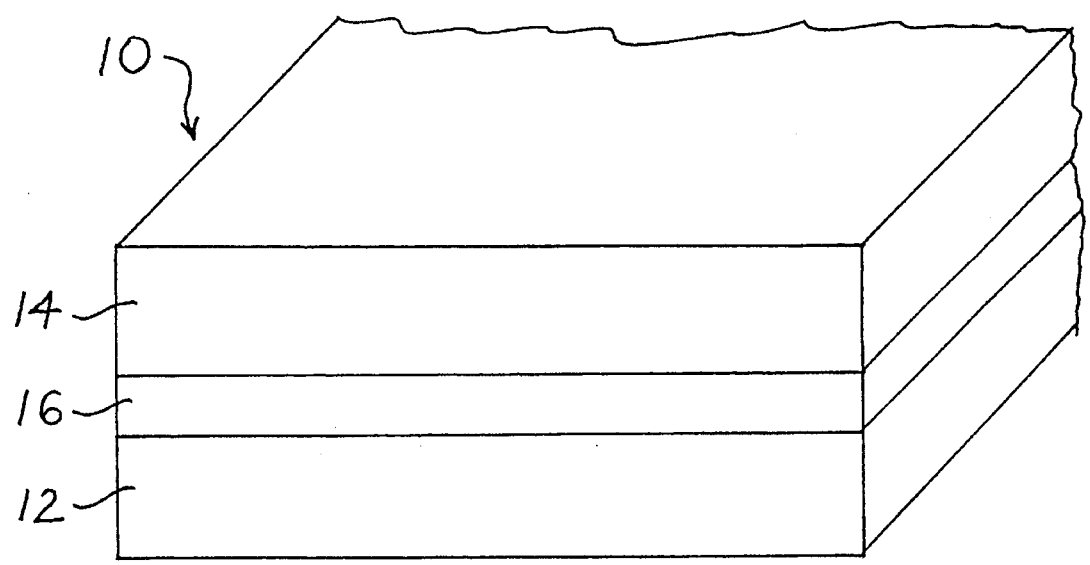

Referring now to the drawing, there is illustrated a typical cross-section of a structural firewall 10 formed of an integrated structural composite and ceramic flame barrier in accordance with the invention. The structural firewall 10 generally is comprised of three layers. The first is a layer or ply of material 12 which is a structural polymer composite and can be of any type of a polymer composite that provides the strength and characteristics desired. The second is a layer or ply of material 14 which initially is a fabric or fabrics of bidirectional woven glass, carbon, graphite or ceramic fibers presoaked with a polymer precursor of a ceramic matrix. This second layer is more fully described below. The two layers are bonded together by an intermediary third layer which is a fiber reinforced film adhesive 16. The reinforcing fibers can be of any compatible fiber such as glass, nylon, polyester or carbon. Examples are Nicalon fiber made by Nippon Carbon Co., Ltd., Nextel fibers made by 3M Co., or Astroquartz fibers made by JPS Industries Fabrics Corp.

The structural polymer composite can be selected from an extremely broad range of materials and will be chosen by the design engineer based upon the strength and characteristics desired of the finished product. For example, a load bearing firewall panel will have different strength requirements than a seat or cabinet for an airplane.

The composite material is a combination of two or more materials which are reinforcing elements, filler and composite matrix binder, which differ in form or composition on a macroscale. The constituents retain their identities, i.e., they do not dissolve or merge completely into one another although they act in concert. Normally, the components can be physically identified and exhibit an interface between one another.

The polymer is a high molecular weight organic compound, natural or synthetic, whose structure can be represented by a repeated small unit. Examples are polyethylene, rubber and cellulose. Synthetic polymers are formed by addition or condensation polymerization of monomers. Some polymers are elastomers, some are plastics and some are fibers. When two or more dissimilar monomers are involved, the product is called a copolymer. The chain lengths of commercial thermoplastics vary from near a thousand to over one hundred thousand repeating units. Thermosetting polymers approach infinity after curing, but their resin precursors, often called prepolymers, may be relatively short, on the order of 6 to 100 repeating units, before curing. The lengths of polymer chains, usually measured by molecular weight, have very significant effects on the performance properties of plastics and profound efforts on processability.

The structural polymer composite is a combination of a polymer resin and a reinforcing fiber for the purpose of providing a structure. Typically, high strength to weight ratio is a desired characteristic of a structural polymer composite. Other "characteristics" may include: Thermal conductivity, electrical conductivity, bearing surfaces, surface finish, coefficient of thermal conductivity and poisson ratio. Examples of polymer composites are carbon fiber reinforced epoxy or glass fiber reinforced epoxy.

The process for fabricating the structural firewall 10 is unique in that it is a one-step process. The structural polymer composite layer 12, first is placed in a form, which is in the shape of the finished product such as a seat, firewall or cabinet. The film adhesive layer 16 then is placed atop the polymer layer 12. The fiber reinforced layer 14 presoaked with the polymer precursor of ceramic matrix is placed atop the film adhesive layer 16. The form, including the three layers of materials, is then cured in a traditional composite fabrication technique using, for example, an autoclav. The curing temperatures are low, in the range of 150°–350° F. During the co-curing of the materials, the film adhesive layer 16 prevents the polymer precursor from diffusing into the polymer composite layer 12 and also serves the purpose of bonding the two layers 12 and 14 together. One example of the film adhesive 16 is a glass fiber scrim reinforced film adhesive of the type commercially available from American Cyanimide, or Hysol Corporation. As previously stated, the reinforcing fibers may be nylon, polyester or carbon.

The polymer precursor of a ceramic matrix is a polymer precursor of an amorphous silica-based glass, such as "BLACKGLAS" manufactured and sold by Allied Signal Corporation, or other glassious ceramic materials having the same or similar characteristics, such as those manufactured and sold by Pratt-Whitney and Dow Chemical Corporation.

The polymer precursor, as indicated above, remains a polymer until it is subjected to a polymerization/pyrolyzation process at pyrolyzation temperatures, at which time it undergoes a conversion to a silica ceramic and forms an insitu flame barrier with a superior flame resistance to flames up to 2200° F. In most conventional applications, the polymerization/pyrolyzation process is done in a controlled time and temperature environment at temperatures of generally 1500°–1800° F. for several hours. However, in this application, heat in excess of 1500° F. is supplied by exposure to a flame such as in an accidental fire. Even though not done in a controlled time and temperature environment, the heat from the flame polymerizes and pyrolyzes the polymer precursor forming the high temperature flame barrier.

This provides a firewall 10 which is lightweight and capable of withstanding a high temperature flame for an extended period of time without burnthrough. The resulting firewall 10 also is an integrated structural composite and flame barrier which has sufficient strength to function as a load sharing member of the structure prior to being exposed to a high flame temperature.

Thus, there is provided a structural firewall and method of manufacturing the same that fully satisfies the aims, objects and advantages set forth above. It is evident that many alternatives, modifications and variations will be apparent to those skilled in the art. Accordingly, it is intended to embrace such variations as fall within the spirit and broad scope of the appended claims.

What is claimed is:

1. An integrated structural composite panel and ceramic flame barrier having sufficient structural strength to form a rigid load bearing support member comprising in combination:

a first layer being a structural polymer composite having sufficient structural strength to define and form the load bearing support member, a second layer bonded to the first layer, being a fiber reinforced film adhesive, and a third layer bonded to the second layer, being a polymer precursor of a ceramic matrix exhibiting polymeric properties at one temperature and ceramic matrix properties at a higher pyrolization temperature, the first and third layers being separated by the second layer, and the three layers being co-cured in a one-step process below the pyrolization temperature, the polymers in the first and third layers being different.

2. The integrated structural composite panel and ceramic flame barrier of claim 1 wherein said second layer of fiber reinforced film adhesive prevents said polymer precursor from diffusing into said polymer composite during the co-curing process.

3. The integrated structural composite panel and ceramic flame barrier of claim 1 wherein the polymer precursor of a ceramic matrix comprises an amphorous silica-based glass precursor polymer which remains a polymer during the co-curring process.

4. The integrated structural composite panel and ceramic flame barrier of claim 3 wherein said amphorous silica-based glass precursor polymer remains a polymer during the co-curring process and undergoes a conversion to a silica ceramic when subjected to a temperature above 1500° F.

5. The integrated structural composite panel and ceramic flame barrier of claim 1 and further comprising reinforcing fibers embedded within the third layer.

6. The integrated structural composite panel and ceramic flame barrier of claim 5 wherein said reinforcing fibers in the third layer comprise at least one member selected from the group consisting of glass fibers, ceramic fibers, carbon fibers and graphite fibers.

7. The integrated structural composite panel and ceramic flame barrier of claim 1 wherein the second layer is a glass fiber reinforced film adhesive.

8. The integrated structural composite panel and ceramic flame barrier of claim 5 wherein said third layer fibers are woven bidirectional into a fabric and are presoaked with said polymer precursor of a ceramic matrix.

* * * * *